2 Sheets—Sheet 1.

C. B. TURNER.

Car Brake.

No. 1,783. Reissued Oct. 4, 1864.

Witnesses.

Laurd Lydig

R. Smalley Jr.

Inventor:

Chas. B. Turner,

Alfred Berry

Assignee.

AM. PHOTO-LITHO. CO. N.Y. (OSBORNE'S PROCESS.)

2 Sheets—Sheet 2.

C. B TURNER.

Car Brake.

No. 1,783. Reissued Oct. 4. 1864.

Witnesses:

David Lydig

Armstrong

Inventor:

Chas. B. Turner,

Alfred Berney

Assignee.

AM. PHOTO-LITHO. CO. N.Y. (OSBORNE'S PROCESS.)

UNITED STATES PATENT OFFICE.

ALFRED BERNEY, OF JERSEY CITY, NEW JERSEY, ASSIGNEE, BY MESNE ASSIGNMENTS, OF CHARLES B. TURNER.

IMPROVED MODE OF OPERATING BRAKES FOR RAILROAD-CARS.

Specification forming part of Letters Patent No. 5,918, dated November 14, 1848; extended November 14, 1862; Reissue No. 1,783, dated October 4, 1864.

DIVISION B.

*To all whom it may concern:*

Be it known that CHARLES B. TURNER, of Buffalo, in the county of Erie, in the State of New York, deceased, did in his life-time invent certain new and useful Improvements in Brakes for Railroad-Cars; and I do hereby declare that the following, taken in connection with the drawings, is a full, clear, and exact description thereof.

Figure 1:
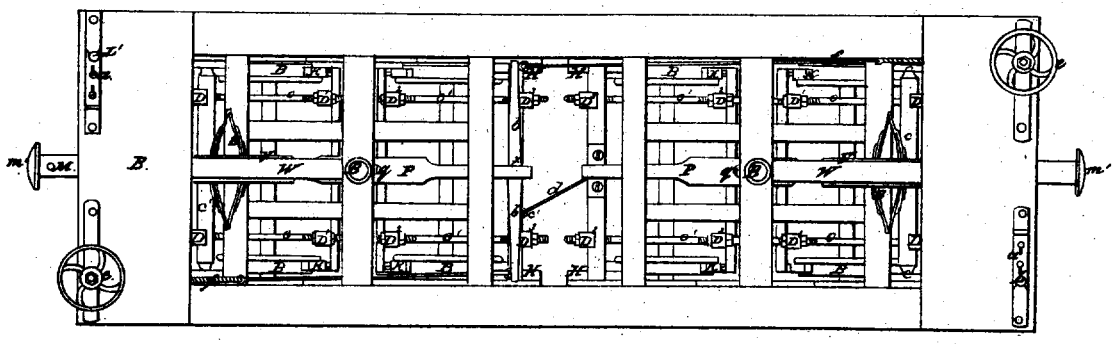
Figure 2:
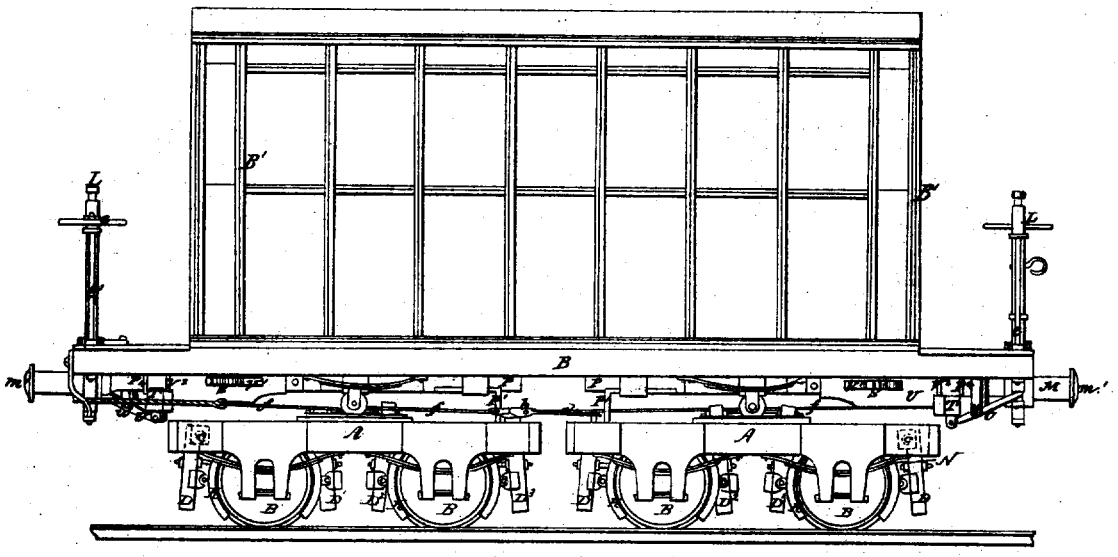
Figure 3:
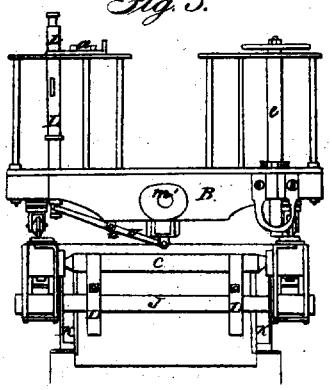
Figure 4:
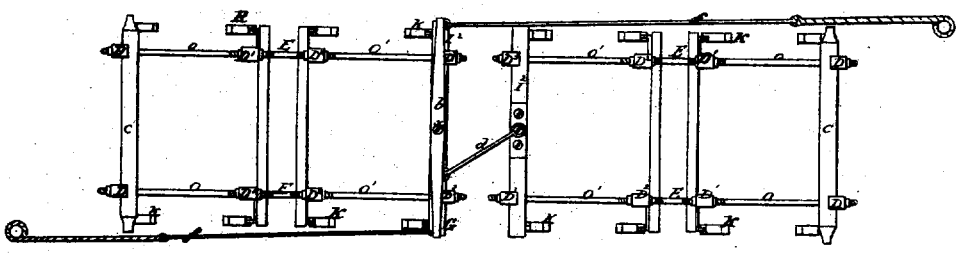
Figure 5:
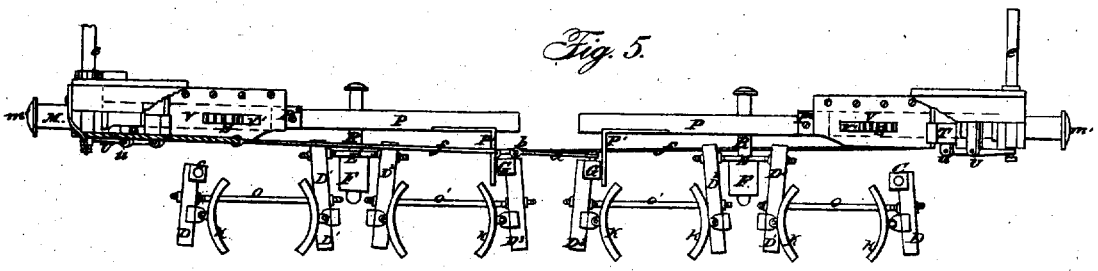
Figure 6:
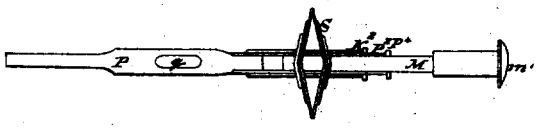
Figure 7:
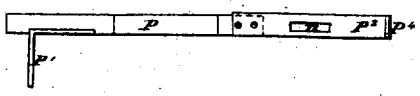
Figure 8:
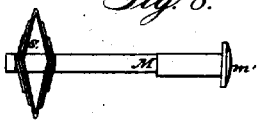

In the drawings, Figure 1 is a plan or top view of a car with the body thereof removed. Fig. 2 is a side elevation of the car. Fig. 3 is an end elevation of the car with the body removed, and in all these figures the invention is represented. Fig. 4 is a plan of the system of brakes only. Fig. 5 is a side elevation of the same, representing also parts of the platform; and Figs. 6, 7, 8, and 9 are detailed views, illustrating appliances for putting the brakes in operation by a force derived from the momentum of the cars.

In an application for a patent bearing even date herewith are specially described and claimed those features of the invention of the aforesaid TURNER which relate to a new method of actuating the brake systems of two trucks by means of a single windlass, and also a new and improved arrangement and combination of levers for making pressure upon the peripheries of car-wheels, and in this patent will be especially described and claimed that part of the invention which relates to a method of applying brakes by a power or force derived from the momentum of the cars, whereby the brakes of any or all of the cars in a train may be put in operation by self-acting mechanism when a locomotive, or tender, or one of the cars in a train is caused to move at a less velocity than the other cars behind it.

In the drawings the trucks are represented at A A, the platform at B B, and the car-body at B′. The trucks are attached to the car-body in any proper or convenient manner, as by king-bolts at R R, and are themselves of any usual or proper construction. To the framing of each truck is pivoted a cross-bar, *c*, and as the system of brakes in each truck is exactly the same, a description of one will serve for both. To the cross-bar *c* are attached two pendent levers, D D, connected by a cross-bar, J, and these levers are, by means of rods O O, fitted with suitable hinges and screws for adjusting them, connected to two other pendent levers, D′ D′, which are at their upper ends connected, by similar rods E E, with the upper ends of levers $D^2$ $D^2$, these latter being, by means of similar rods, O′ O′, connected with levers $D^3$ $D^3$, the upper ends of which are attached to a cross-bar, the extremities of which rest and may be moved upon ledges H H, attached to the truck-frames. Each lever is connected at its lower end to its fellow on the opposite side of the truck by the cross-bars J, and the lower ends of all the levers are, by means of ears and pivots, or in other suitable manner, fitted with shoes or brake-rubbers K K K.

The ledges H H serve to support the last pair of levers in each system, and the rods E E slide on top of the cross-beams F F of the trucks A A, thus supporting the two pairs of levers nearest the center of each system.

Upon one of the bars G is pivoted, at *x*, a lever, *b*, and each end of this lever is connected, by rods and chains *f f*, with a windlass, *e*, at each end of the platform. This lever is also connected, by a rod, *d*, with the other bar G.

When either windlass is operated to wind up the chain, it will oscillate the lever *b*, and cause the two bars G and levers attached to them to approach each other. As they approach, two corresponding shoes on opposite sides of each truck will be brought to bear upon their wheels, and will become fulcra for the levers to which they are attached. Then another pair of shoes in each truck will be brought into action, and so on, in succession, till all the rubbers in both trucks are brought into operation, a peculiarity of the system described being that all the rubbers in each truck, and the rubbers in both trucks, must be brought into operation by a force derived from either windlass in spite of unequal wear of connections or of shoes, or change of position of trucks, either in relation to each other or to the car-platform; but as the invention claimed in this patent relates to a method of braking up a car by means of force derived from the momentum of other cars, or from its own momentum, the system of brakes in each truck has been described in this patent solely for the purpose of showing a practical mechanism to which the force derived from the momentum of the cars can be applied, and a method of applying hand-power to these brakes has been described in this patent solely for the purpose of pointing out a manner of putting the brakes in operation by such power in case of necessity.

The mechanism invented by the said TURNER for operating brakes by the momentum of the cars will now be described, and, as the mechanism at each end of the car is the same, one description will serve for both. Two cheeks or plates, *v v*, are attached to a beam, *w*, in such a manner as to form ways or guides parallel with the length of the car. Each of these plates is slotted at *v'*, and has upon the end nearest the end of the car a flange, $v^2$. A strong bar, P, having attached to one end of it a projection, P', and at the other end two metallic plates, $P^2$ $P^2$, and slotted, as at *q*, is arranged between the body of the car and the truck-frame, being held up by suitable clasps or guides. The king-bolt passes through the slot *q*, and the metallic plates, which are in fact an extension of the bar, slide in the guides or ways *v v*, the projection P' hanging down so far that its lower end may strike against the cross bar G. The bar P is free to slide back and forward, and its metallic plates are flanged, as at $P^4$ $P^4$. A rod, M, having on one end a bumper, *m'*, and, if desired, a draw-link, or means of attaching one, is fitted to the car-frame, as draw-bars usually are, and so as to slide between the metallic plates $P^2$ $P^2$, and is slotted at *n*, and when in place in relation to the rod P and the guides, a spring—such as S—is to be passed through the slots in the rod, the metallic plates, and the guides.

Figure 9:
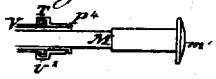

A forked lock-plate, T, is fitted to one end of a lever, U, pivoted at *u*, and the other end of this lever is connected with a rod, L, sliding in proper guides in the platform, and combined with a sliding catch, *a*, taking into notches in the rod, the catch being suitable for retaining the rod either raised to permit the bumper to act on the brakes or depressed so that the bumpers will act as bumpers and draw bars merely. The lock-plate, as may be seen by reference to Fig. 9, is fitted to embrace the flanges in the guides, and to enter between them and the flanges $P^4$ $P^4$. The object of the lock plate is to prevent the bar P from sliding backward by locking it to the guides when the lock-plate is raised, and to free the bar P so as to permit it to slide when the lock-plate is depressed. If the lock-plate be raised then the bumper *m'* and draw-bar M will be an ordinary bumper and draw-bar, acting upon the car through the spring by the aid of the cheeks *v*; but when the lock-plate is depressed and the car to which the contrivance is applied has its velocity checked, then the after bumper in that car will be struck by the forward bumper of the following car, and, if both cars be fitted with the contrivance, both bumpers, as they slide inward, will, through the spring, cause the rods P P to slide toward the centers of their respective cars, and these rods, striking against the cross-bars G G, will put the brakes of the truck system to which they appertain in operation. If all the cars and the tender be provided with the mechanism described, all the brakes will be put in operation automatically by a retardation of the locomotive, except the brakes of the last truck in the train, and a retardation of any car will cause the brakes of the car or cars behind it to be put in action, provided always that the lock-plates are out of their locking position.

It is not deemed necessary to enlarge upon the utility of a contrivance which enables the engineer to apply brakes to all the cars, but the spring-connection between the bumpers and the sliding rods deserves attention, as by its use the brakes are applied without sudden jar and the rubbers are held in contact with the wheels by a yielding pressure. Moreover, the spring, when arranged as described, not only performs these functions, but also acts as an ordinary bumper and draw-bar spring.

What is claimed as the invention of the aforesaid C. B. TURNER is—

1. The combination of a sliding bumper with a rod and a brake system and an interposed spring, the combination being substantially as specified, and operating substantially as described.

2. The combination of a sliding rod, a bumper, a spring, a guide or cheeks, and a locking-plate, all substantially as set forth, whereby the spring forms a connection either between the bumper and the car-body or the bumper and a system of brakes, substantially in the manner and for the purposes set forth.

3. A locking-plate, in combination with a sliding rod capable of operating a brake-system and a bumper, whereby the bumper may either be permitted to or prevented from communicating motion to a brake-system under a mode of operation substantially as hereinbefore set forth.

ALFRED BERNEY.

Witnesses:
DAVID LYDIG,
R. MULLIGAN.